United States Patent [19]

Shimirak et al.

[11] Patent Number: 4,704,500
[45] Date of Patent: Nov. 3, 1987

[54] APPARATUS FOR RELIEVING A LOAD ACROSS A CABLE REPAIR REGION

[75] Inventors: Gerald L. Shimirak, Raleigh; Lowell I. Koht, Cary, both of N.C.

[73] Assignee: Raychem Corporation, Menlo Park, Calif.

[21] Appl. No.: 797,285

[22] Filed: Nov. 12, 1985

[51] Int. Cl.⁴ ...................... H02G 15/07; H02G 15/18
[52] U.S. Cl. ......................................... 174/93; 174/69; 174/78
[58] Field of Search ............ 339/9 R, 9 E, 9 A, 14 L, 339/222; 174/13, 21 CA, 99 E, 69, 88 R, 91–93, 72, 78

[56] References Cited

U.S. PATENT DOCUMENTS

| 833,290 | 10/1906 | Betts | 339/9 E |
|---|---|---|---|
| 1,967,340 | 7/1934 | Van Splunter | 339/222 |
| 3,479,444 | 11/1969 | Hus | 174/99 E |
| 3,885,087 | 5/1975 | Takada et al. | 174/93 |
| 4,204,085 | 5/1980 | Chapman et al. | 339/9 E |

FOREIGN PATENT DOCUMENTS 914403  7/1954  Fed. Rep. of Germany ........ 174/69

OTHER PUBLICATIONS

Perry, Chemical Engineers' Handbook, 4th Ed., FIG. 11-3, McGraw-Hill, 1963.

Primary Examiner—Neil Abrams
Attorney, Agent, or Firm—Dennis E. Kovach; Herbert G. Burkard

[57] ABSTRACT

A rigid but flexible bondbar interconnects first and second electrical cable ends in a vicinity of a splice region thereof, the bondbar being shaped and constructed such that it is substantially rigid when exposed to axial tensile loads below a first value and is irreversibly bent when subjected to axial tensile loads above the first value, an overall flex length of the bondbar being such that both of the cable ends are prevented from being pulled out of the cable repair region.

14 Claims, 3 Drawing Figures

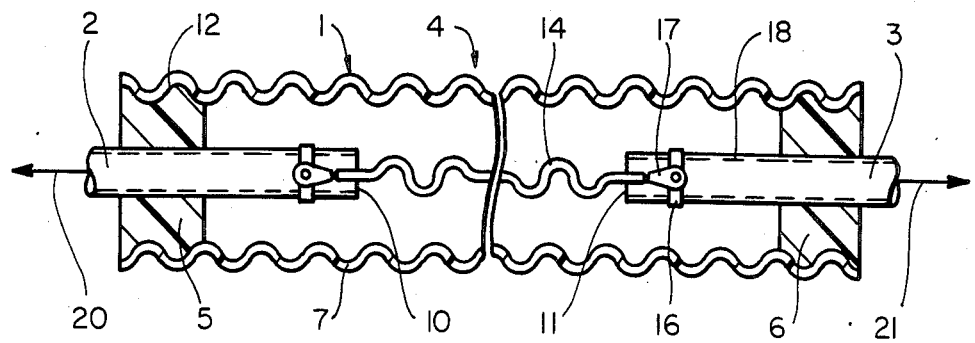
FIG_1
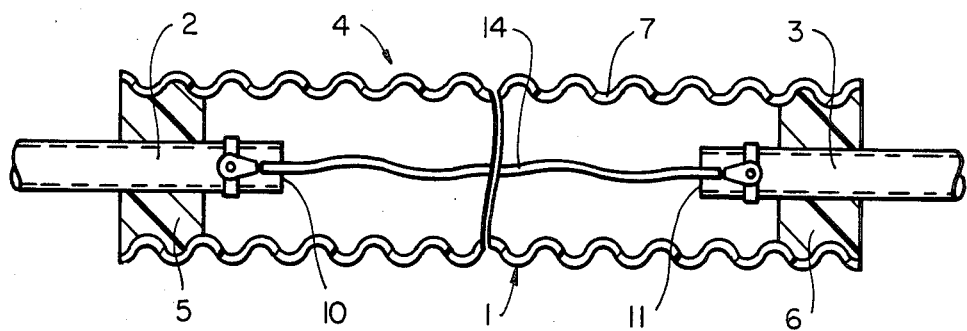
FIG_2
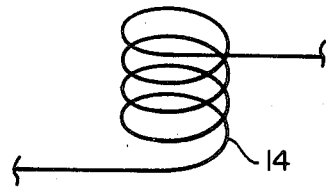
FIG_3

APPARATUS FOR RELIEVING A LOAD ACROSS A CABLE REPAIR REGION

BACKGROUND OF THE INVENTION

The present invention relates to an apparatus for limiting a load across a cable repair region while preventing a cable sheath from being pulled out of a closure enclosing the cable repair region.

Oftentimes electric cables, especially aerial telephone cables, are repaired so to form a repair region therein, such repairs being necessitated for example subsequent to splicing electrical conductors within the cable, providing drops for various ones of the electrical conductors, etc. The repair region includes an apparatus for enclosing first and second cable sheath ends confronting opposite sides of the repair region as well as the repair region itself, the enclosure apparatus being designed to prevent or minimize environmental contaminants from entering the cable repair region or entering either one of the first and second cable ends, a common environmental contaminant being water.

In case of aerial cable repair regions, oftentimes the enclosure apparatus is installed during warmer months when it is more convenient to repair outside plant equipment. In this case, a problem exists in the art during colder months since a drop in temperature from that which existed when the enclosure apparatus was installed causes the cable sheath to contract and tend to pull out of the enclosure apparatus so as to expose at least one of the ends of the cable sheath to the environment.

Prior art attempts to solve this problem have included the use of a low tensile strength braided mesh which easily expands when subjected to an axial tensile load of a pound or so, with an expanded length of the mesh being such that when fully expanded neither cable sheath end is pulled out of the enclosure apparatus. However, though this solution works fine so long as the mesh is not fully expanded, a problem exists subsequent to the mesh being fully expanded since it then fails in tension thus allowing one or the other of the cable sheath ends to be pulled out of the enclosure apparatus, the mesh having negligible internal strength.

SUMMARY OF THE INVENTION

Accordingly, it is an object of the invention to provide an apparatus for preventing a cable sheath from being pulled out of a cable repair region, the apparatus further functioning to limit a load applied across the cable repair region.

These and other objects are achieved by the provision of a flexible bondbar having opposite ends in communication with a first load imposed across first and second cable sheath ends, respectively, the bondbar being shaped and being constructed such that it is rigid when the first load is a tensile load below a first value and is flexible when the first load exceeds the first value, the first value being above a threshold value, for example above 10, 20, 30, 40, 50, 60, 70, 80, 90, 100 or 110 pounds respectively, the bondbar having limited flexibility such that neither end thereof will protrude beyond an end of the repair region when the bondbar has flexed a maximum amount, the bondbar preferably having a fracture tensile strength greater than a fracture tensile strength of either the cable sheath or an area where the bondbar is secured to clamps which are in turn secured to the cable sheath, the fracture tensile strength of the bondbar preferably being as great as 50, 100, 150, 200, 250, 300, or 350 pounds, the bondbar being especially useful for aerial cables, especially telephone cables, the bondbar preferably being rigid subsequent to flexing any amount so as to retain any flexed shape thereof even when subjected to additional tensile or compression loads.

Preferably, the clamps used to secure the bondbar to first and second cable sheath ends confronting opposite sides of the cable repair region are in turn connected to an electrical ground shield of the cable so as to protect the repair region in the event the cable is exposed to a high voltage load, as can occur from a lightening strike.

BRIEF DESCRIPTION OF THE DRAWINGS

FIG. 1 illustrates one preferred embodiment of the invention prior to a bondbar incorporated therein being expanded and flexed;

FIG. 2 illustrates the apparatus of FIG. 1 subsequent to the expansion of the bondbar; and FIG. 3 illustrates an alternative bondbar embodiment useful according to the invention.

DESCRIPTION OF THE PREFERRED EMBODIMENTS

FIGS. 1 and 2 illustrate a cable repair region 4 enclosed by environmental enclosure apparatus 1 which includes first and second end seals 5, 6 and a member 7 therebetween, a preferred shape of an interface between the end seals 5, 6 and the member 7 being convoluted in a sinusoidal like-shape so as to present multiple barriers for water migration down an interface 12 between the member 7 and the end seals. A preferred shape and construction of the end seals 5, 6 and the member 7 are disclosed in copending U.S. application Ser. Nos. 698,643 filed Feb. 6, 1985 and 730,697 filed May 2, 1985, both assigned to the assignee of the present invention, the disclosures of which are incorporated herein by reference.

The repair region 4 typically contains splices between electrical conductors (not shown) in first and second cables 2, 3, though splicing is merely one example of a situation where a repair region 4 exists and a need for environmentally enclosing it.

According to the invention, a flexible but rigid bondbar 14 interconnects the first and second cables 2, 3 via clamps 16 which are attached to the cables 2, 3, opposite ends of the bondbar 14 being secured to the clamps 16 via connections 17 which can be for example crimp connections or bolt connections. Preferably, the bondbar 14 is electrically connected to electrical ground cable shields 18 in the first and second cables 2, 3, the ground cable shields surrounding electrical conductors contained within the cables 2, 3, electrical connection with the bondbar 14 providing a means of protecting electrical conductors within the repair region 4 from high voltage arcing between the cable ends 10, 11 which could occur if either one of the cable shields 18 were to experience a different electrical potential than the other as could occur for example in a lightening strike.

The bondbar 14 is preferably semirigid in that it experiences substantially negligible dimensional changes when subjected to an axial tensile load below a first value, the first value being for example 10, 20, 30, 40, 50, 60, 70, 80, 90, 100, or 110 pounds, the exact value depending on the anticipated need for the types of cables 2, 3 being interconnected at the region 4. Accordingly, whenever an axial tensile load is imposed across the repair region 4 by pulling either one of the cables 2, 3 in the directions indicated by arrows 20, 21 respectively, the ends 10, 11 of the cables 2, 3 are prevented from moving axially due to the internal structural strength of the bondbar 14.

However, if extremely large axial tensile loads are imposed across the splice region 4, as can occur due to large temperature variations wherein sheaths of the cables 2, 3 contract, to minimize any chance of the load becoming excessive to a degree such that either one of the cable sheaths tears in a region outside the repair region 4, the bondbar 14 is shaped and constructed such that it becomes flexible when subjected to a tensile load above the first value and accordingly can and will increase its straight line distance length between opposite ends of the bondbar. However, to prevent the straight line distance length between the opposite ends of the bondbar from becoming excessively large such that either one of the ends 10, 11 of the cables 2, 3 is allowed to pull out of its respective end seal 5, 6 along a direction indicated by the arrows 20, 21, a total length of the bondbar is kept substantially smaller than a distance between the end seals 5, 6 which is maintained fixed due to the relatively constant length of the member 7. Accordingly, as FIG. 2 illustrates, when the bondbar 14 has been completely elongated, neither end 10, 11 of the cables 2, 3 protrudes outside the repair region 4. According to one preferred embodiment, a flexing distance of four inches is used, though other distancs can be chosen if desired.

A further advantageous characteristic of the bondbar 14 is that subsequent to reaching its ultimate elongation as illustrated in FIG. 2, it continues to have a high internal structural strength such that it is capable of withstanding substantial axial tensile loads so as to ensure that neither end 10, 11 of the cables 2, 3 is capable of being pulled out of the repair region 4 by the bondbar fracturing, a preferred embodiment constituting forming the bondbar 14 of a material such that its tensile strength exceeds that of the cable sheaths, which typically are capable of withstanding a load of approximately 250 pounds. Furthermore, if desired, the bondbar 14 can be formed so as to have an internal strength greater than that of the connections 17 whereby the bondbar 14 is connected to the clamps 16.

A preferred embodiment of the bondbar 14 is to form it from wire such that opposite longitudinal ends thereof have several sinusoidal-like bends therein, with the opposite ends of the bondbar 14 being interconnected by a substantially straight section. According to this embodiment, the first value at which the bondbar 14 begins to elongate can be varied by varying an arc of the bends in the wire at the opposite ends, varying a radius of curvature of the bends, and by varying the number of bends, with the result that as the bend angle is increased so is the first value of which the bondbar begins to elongate. The embodiment in FIG. 1 is exemplary only, and FIG. 3 illustrates another embodiment wherein a plurality of stacked coils are provided in the bondbar, and it will further be appreciated that longitudinally disposed coils could be used as well, as well as various other geometric designs, all of which are included within the scope of the invention.

EXAMPLE

A bondbar 14 was constructed by taking a #6 AWG wire having an outside diameter of approximately a quarter inch and bending opposite ends thereof so as to each have three sinusoidal-like bends, a radius of curvature of each bend being approximately one quarter inch, and a sector angle therearound of each bend being approximately 60°. When subjected to an axial load, the bondbar as constructed experience negligible elongation for loads below 80 pounds. However, at a constant load of 150 pounds, the bondbar elongated until it reached its ultimate elongation, and thereafter the bondbar withstood the 150 pound load. Thereafter, the bondbar was loaded at a tensile load of 250 pounds at which point the cable sheath to which it was attached failed. Thereafter, the bondbar and the connections secured to opposite ends thereof were subjected to an axial load of 350 pounds at which point the connections pulled away from the bondbar.

Though the invention has been described with reference to certain preferred embodiments thereof, it should be appreciated that various modifications thereto within the spirit and scope of the invention are possible, and the invention is accordingly to be limited only by the appended claims.

What is claimed is:

1. An apparatus for at least partially relieving a first load across first and second cable sheaths located at opposite sides of a cable repair region, comprising:
   a closure enclosing the repair region, the closure having first and second end seals defining opposite ends of the repair region;
   a bondbar disposed within the closure and between the first and second end seals, the bondbar having opposite ends in communication with the first load imposed across the first and second cable sheaths, respectively, the bondbar being shaped and being constructed such that it is rigid when the first load is a tensile load below a first value and is flexible when the first load is a tensile load which exceeds the first value so as to at least partially relieve a value of the first load to reduce stress on the cable sheaths, the first value being 10 pounds; and
   means for attaching the bondbar opposite ends to an outer surface of the first and second cable sheaths, respectively;
   means for electrically connecting the bondbar to a ground shield of the first and second cables.

2. The apparatus of claim 1, the first value being 50 pounds.

3. The apparatus of claim 1, the first value being 80 pounds.

4. The apparatus of claim 1, the bondbar having limited flexibility such that neither end thereof will protrude beyond an end of the repair region when the bondbar has flexed a maximum amount.

5. The apparatus of claim 4, the bondbar being shaped and being constructed such that subsequent to being flexed it is substantially rigid and undergoes only negligible dimensional changes when subjected to a tensile load below a second value, the second value being greater than the first value.

6. The apparatus of claim 5, the second value being 100 pounds.

7. The apparatus of claim 5, the second value being 150 pounds.

8. The apparatus of claim 4, the bondbar having a fracture tensile strength in excess of at least one of the first and second cable sheaths subsequent to being flexed the maximum amount.

9. The apparatus of claim 1, the bondbar having limited flexibility such that neither end thereof will protrude beyond either one of the ends of the repair region.

10. The apparatus of claim 1, the bondbar having a fracture tensile strength greater than a fracture tensile strength of a region where the opposite bondbar ends are secured to the attaching means.

11. The apparatus of claim 1, the bondbar having a sinusoidal-like shape at at least one end thereof.

12. The apparatus of claim 11, the bondbar having a sinusoidal-like shape at both opposite ends thereof, and a substantially straight shape in a region between the bondbar ends prior to being flexed.

13. The apparatus of claim 1, the bondbar having a coil-like shape at at least one end thereof.

14. The apparatus of claim 1, the first and second cables being aerial cables, the first load being due to temperature variations.

* * * * *